Nov. 13, 1923.

C. F. HEALY

TOOTHBRUSH

Filed May 31, 1922

1,473,766

Inventor
Charles F. Healy,
By William L. Symons
Attorney

Patented Nov. 13, 1923.

1,473,766

UNITED STATES PATENT OFFICE.

CHARLES F. HEALY, OF NEW YORK, N. Y.

TOOTHBRUSH.

Application filed May 31, 1922. Serial No. 564,971.

*To all whom it may concern:*

Be it known that I, CHARLES F. HEALY, a citizen of the United States of America, residing at New York, in the county of New York and State of New York, have invented certain new and useful Improvements in Toothbrushes, of which the following is a specification.

My invention relates to toilet and dental appliances, and more particularly to toothbrushes. Among the objects of my invention is the construction, as a single article, of a toothbrush, a dentifrice of a suitable form and consistency to be used with the brush, a dental floss receptacle, and a holder or container for these articles.

With this and other objects in view, one embodiment of my invention is shown in the accompanying drawings in which.

Figure 1:
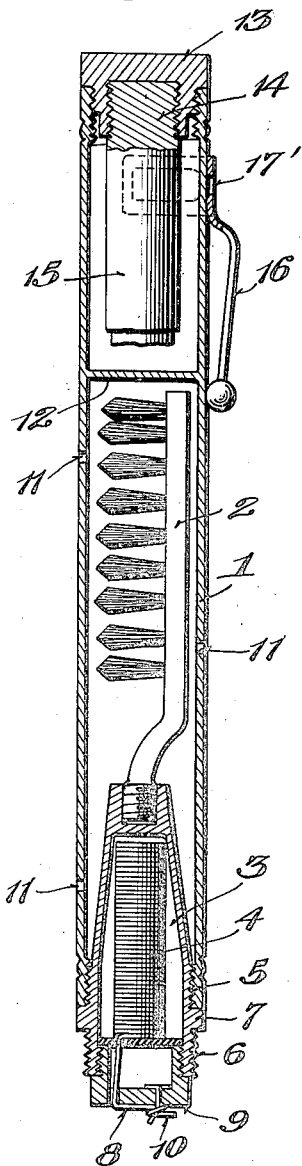
Figure 1 is a longitudinal section through my device.
Figure 2:
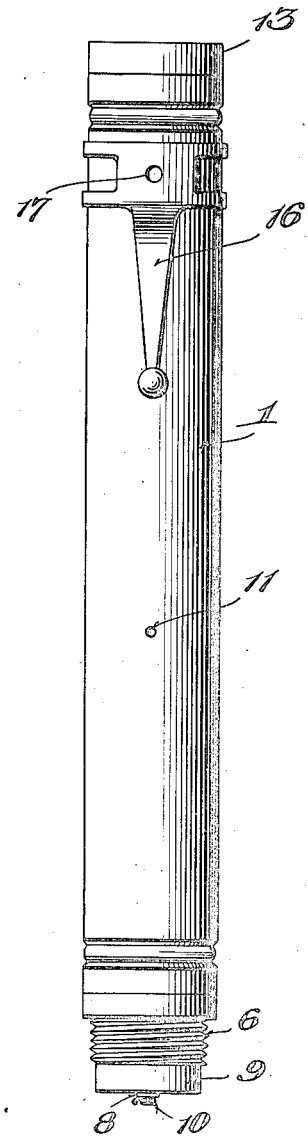
Figure 2 is a plan view thereof.
Figure 3:
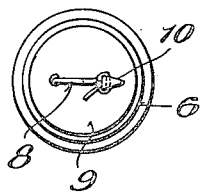
Figure 3 is an end view.

My device may be made of celluloid, metal, or any other suitable material.

A holder or container 1, which is a tube, has inserted in one end thereof a brush 2, having a handle 3 removably connected to said brush as by screw threads. The handle is hollow and suitable for holding a quantity of dental floss 4. The handle is threaded at 5 and 6, a bead 7 being formed between the two threaded parts. It is obvious that this construction adapts the brush to be inserted in the tube when not in use in order to protect the brush from being injured or soiled and also to prevent the wet bristles from coming in contact with any articles with which the toothbrush may be placed. The brush is placed in condition to be used by unscrewing it from the container and inserting in the container the end containing the screw threads 6. When so placed, the brush may be used as an ordinary toothbrush. The end 8 of the dental floss extends through a plug 9, screw-threaded into the end of the container. On the end of the plug is a holding and cutting means 10. The end of the floss may be wrapped around the device 10 to prevent the floss from being pulled out or the end from disappearing into the handle of the brush. This holding means may also have an edge sharp enough to cut the floss when it is desired to cut off a piece for use. Ventilating openings 11 are provided in the holder. The holder is divided into two parts by a partition 12. A screw-threaded cap 13 closes the end of the holder not closed by the brush. This cap has a socket 14 which is screw-threaded to hold a bar or cylinder of dentifrice 15 which is also screw-threaded. The dentifrice to be used with my device is made sufficiently hard to be molded into a bar, a cylinder, or other desired form, and of a consistency enabling it to be rubbed on the bristles of the brush. A clasp or holder 16 may be placed around the container in order that the container may be held in the pocket in the usual way, if desired. The clasp has a hole 17 which enables it to be held my means of a screw or tack in a bathroom or other suitable place to serve as a holding means for the device.

It will be observed from the foregoing description that the device I have invented is adapted for use by persons traveling, though equally servicable to others. When in use and when not in use, it consists of one piece or one unitary article. The advantage of this device therefore is that the user is prevented from losing or mislaying the parts.

While I have shown a preferred construction of my device, it is understood that variations and changes therein may be made without departing from the spirit of the invention.

Having described my invention, what I claim and desire to protect by Letters Patent is:

A device of the kind described comprising a container, a partition in said container dividing said container into two parts, a brush adapted to be removably inserted in one end of said container and adapted to be withdrawn from said container and to be removably attached to one end of said container, a hollow handle for said brush removably attached thereto, dental floss inserted in said hollow handle, said hollow handle having a removable closure therefor, said closure having an aperture therethrough for the passage of the end of said dental floss, and said closure having a floss holder and cutter on the end thereof, and a removable cap adapted to be inserted in the other end of said container, said cap having dentifrice removably inserted in a socket in said cap.

In testimony whereof I affix my signature.

CHARLES F. HEALY.